United States Patent [19]

Takamizawa et al.

[11] Patent Number: 5,421,333
[45] Date of Patent: Jun. 6, 1995

[54] ULTRASONIC DIAGNOSTIC APPARATUS

[75] Inventors: Kinya Takamizawa, Utsunomiya; Makoto Hirama, Ootawara, both of Japan

[73] Assignee: Kabushiki Kaisha Toshiba, Kawasaki, Japan

[21] Appl. No.: 137,269

[22] Filed: Oct. 18, 1993

[30] Foreign Application Priority Data

Oct. 19, 1992 [JP] Japan .................. 4-280197

[51] Int. Cl.$^6$ .............................. A61B 8/00
[52] U.S. Cl. .............................. 128/661.01
[58] Field of Search ............. 128/660.01, 660.05, 128/660.06, 660.07, 661.01, 662.04, 663.01; 73/626, 642, 625

[56] References Cited

U.S. PATENT DOCUMENTS

| 4,062,237 | 12/1977 | Fox | 128/660.05 |
| 4,281,550 | 8/1981 | Erikson | 128/663.01 |
| 4,383,447 | 5/1983 | Kretz | 128/663.01 |
| 4,830,015 | 5/1989 | Okazaki | |
| 4,949,310 | 8/1990 | Smith et al. | 128/660.01 |

FOREIGN PATENT DOCUMENTS 60-160950  8/1985  Japan .

Primary Examiner—George Manuel
Attorney, Agent, or Firm—Finnegan, Henderson, Farabow, Garrett & Dunner

[57] ABSTRACT

An ultrasonic diagnostic apparatus is used to obtain ultrasonic tomography images of subjects under examination. The ultrasonic diagnostic apparatus of the present invention comprises an ultrasonic probe consisting of an array of transducer elements for transmitting and receiving ultrasonic waves, driving means for producing driving signals to excite said transducer elements so that a transmitting beam is transmitted from the ultrasonic probe in a predetermined direction, receiving means for receiving ultrasonic reflected waves from within a subject under examination which form a receiving waves from a predetermined direction of reception by a predetermined number of elements of the plurality of transducer elements and outputting a receive signal, ultrasonic beam direction control means for controlling the driving signals and the receive signal so that the transmitting beam and the receiving waves cross each other within a predetermined region within the subject and the region where the transmitting beam and the receiving waves cross each other is shifted along the direction of the transmitting beam with time, and display means for displaying ultrasonic reflected waves received by the receiving means as an image.

10 Claims, 5 Drawing Sheets

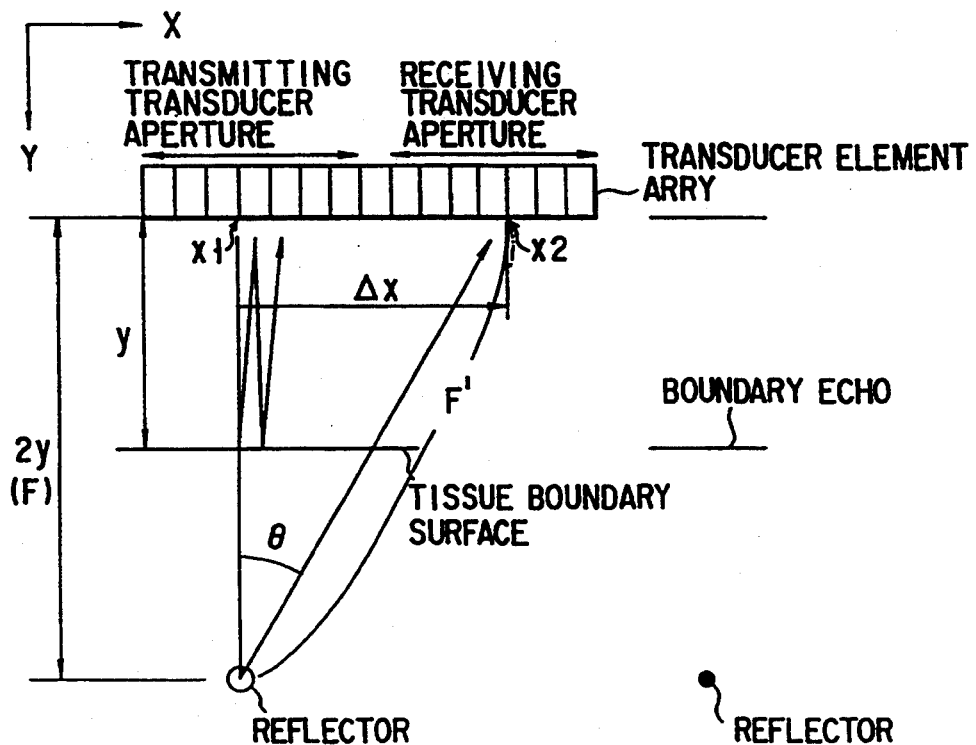
F I G. 2

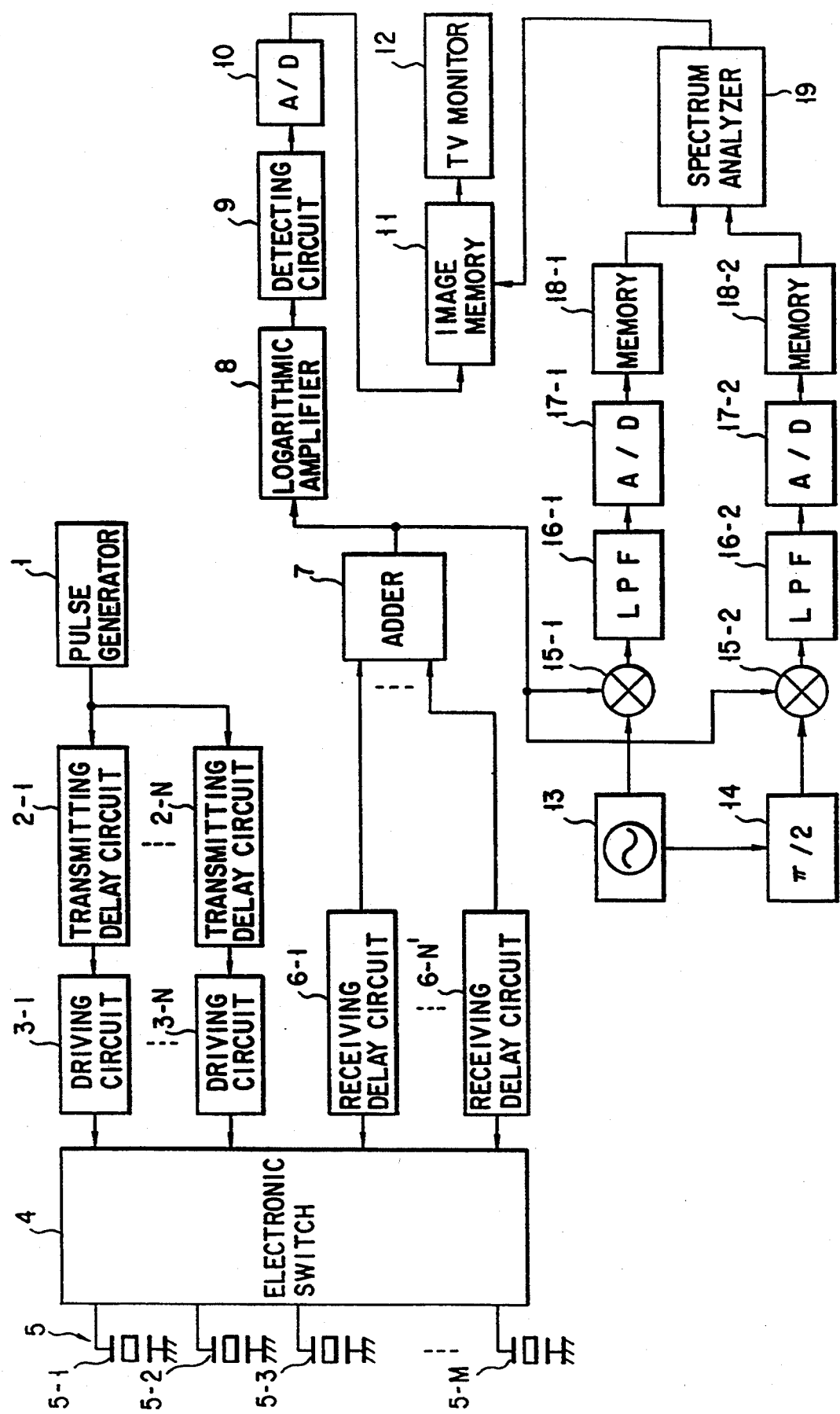
F I G. 3

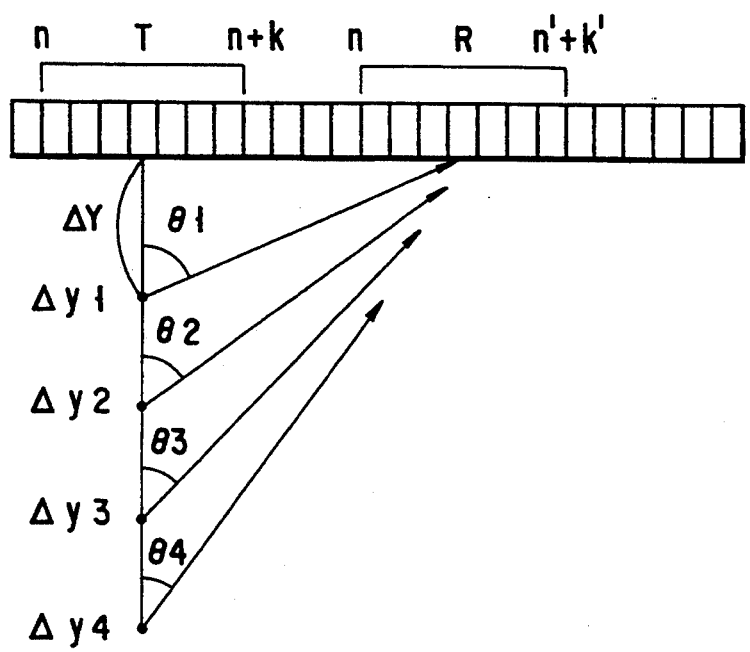
F I G. 4
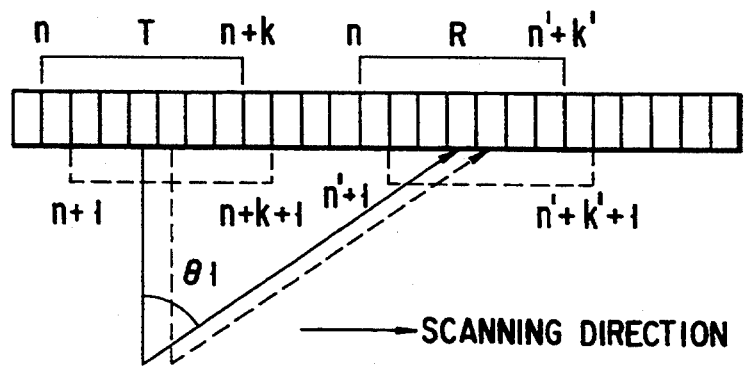
F I G. 5
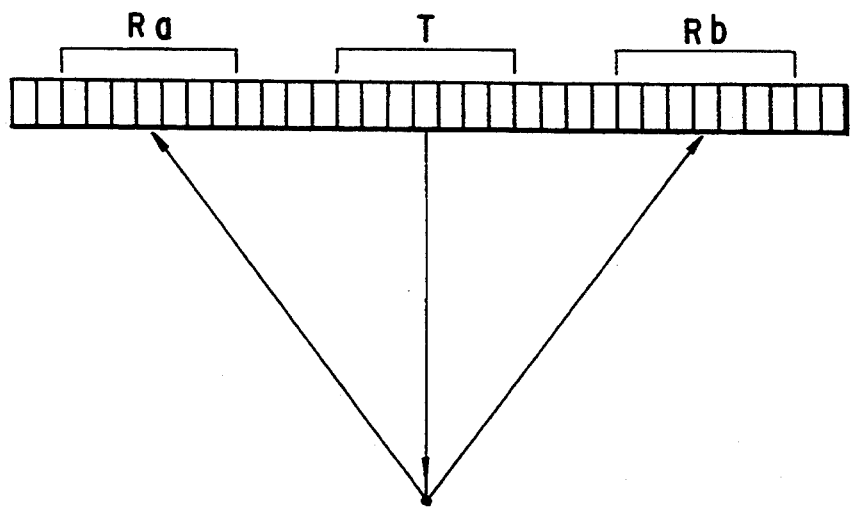
F I G. 8

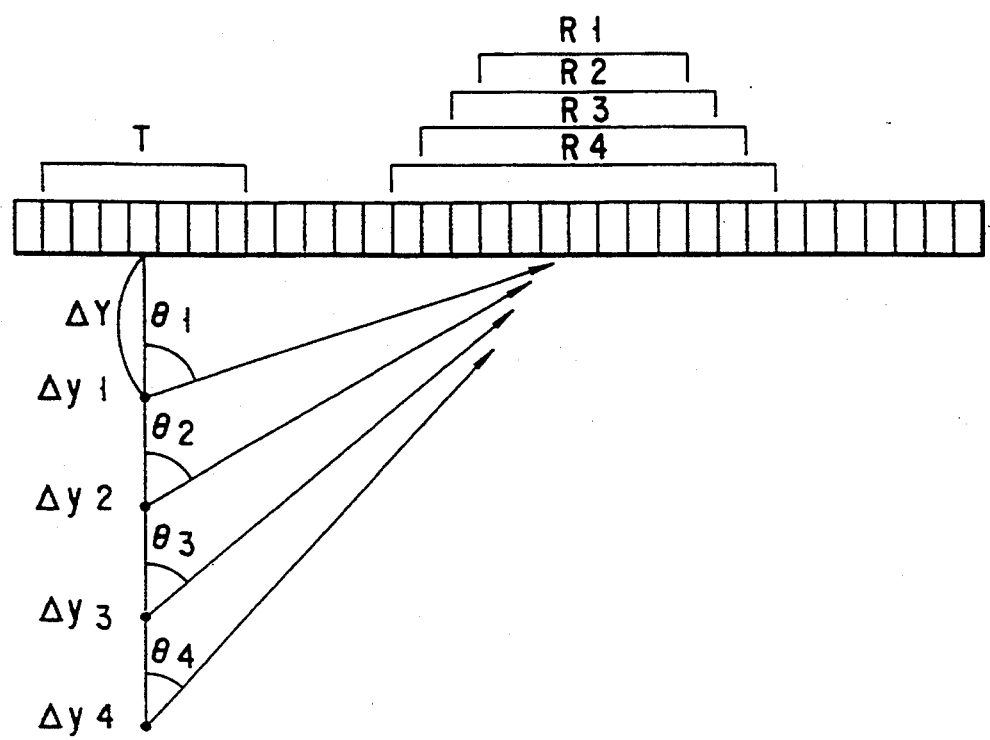
F I G. 6
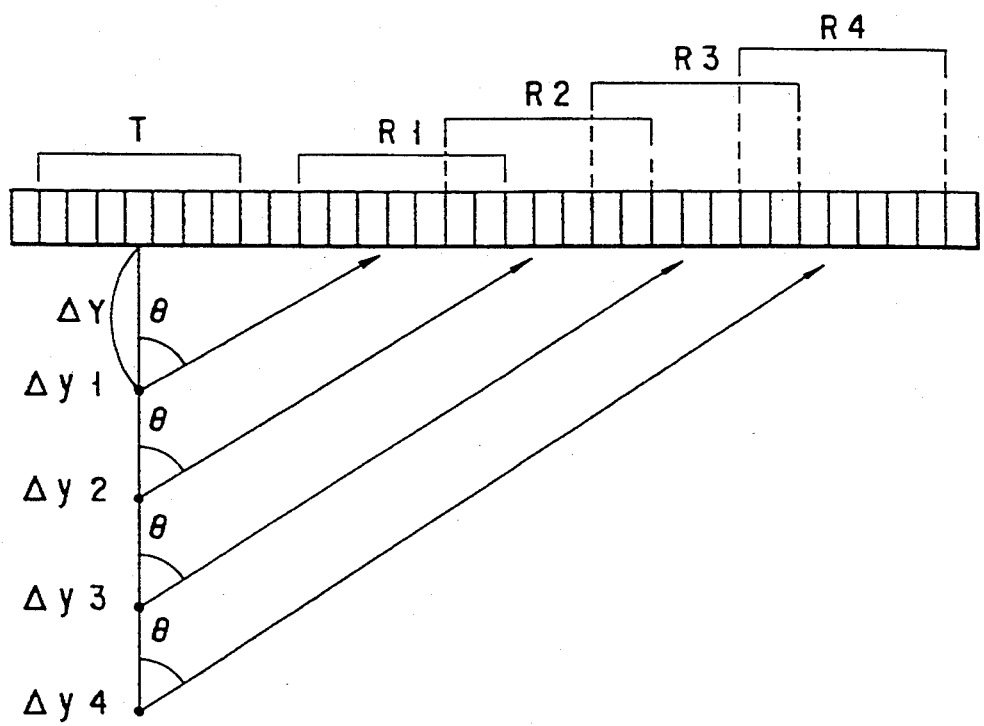
F I G. 7

ULTRASONIC DIAGNOSTIC APPARATUS

BACKGROUND OF THE INVENTION

1. Field of the Invention

The present invention relates to an ultrasonic diagnostic apparatus for displaying ultrasonic tomography images of a subject under examination, and more particularly to an ultrasonic diagnostic apparatus adapted to improve image quality which may be degraded by multiple reflections of ultrasonic waves within the body of the subject for the purpose of ensuring high resolution.

2. Description of the Related Art

Ultrasonic diagnostics, in which pulses of ultrasonic waves are transmitted to a living organism and reflected ultrasonic waves from its various tissues are detected to thereby obtain in vivo information of the organism, has made rapid progress recently owing to the development of two techniques called "ultrasonic tomography" and an "ultrasonic Doppler method". An electronic scanning ultrasonic diagnostic apparatus, which nowadays is most widely used, controls an array of ultrasonic transducers at high speed to scan a body region of a subject under examination. Thus, a tomography image of the body region of the subject is displayed in real time.

An ultrasonic diagnostic apparatus which nowadays is in clinical use adopts a pulse reflection method as with conventional radars and sonars. In the pulse reflection method, pulses of ultrasonic waves are directed into a body region of a subject and reflected ultrasonic waves from the body region of the subject are detected to obtain in vivo information of the subject. Basically a tomography image is constructed from the signal strength of each reflected ultrasonic wave and the interval that elapses from the transmission of each ultrasonic pulse to the time when a corresponding reflected ultrasonic wave is received. In this case, ultrasonic imaging is carried out on the assumption that a single reflection occurs for each ultrasonic pulse transmitted.

In fact, however, so-called multiple reflections occur continually within a living organism under examination. Depending on a body region to be imaged, the multiple reflections cannot be ignored. In particular, multiple reflections between a layered tissue near the body surface and an ultrasonic probe or between internal tissues cause image artifacts to be produced on an ultrasonic tomography image, which often constitutes a serious obstacle to diagnosis. This problem will be discussed with reference to FIG. 1.

It is assumed that, as shown in FIG. 1, a layered structure (i.e., tissue boundary surface) of a living body exists at a distance of y from an array of transducer elements constituting an ultrasonic probe and is substantially parallel to the direction in which the transducer elements are arranged. The time when an ultrasonic wave which has undergone two reflections (multiple reflection) at the layered structure is received by the transducer array is 4 y/c (c is the sound velocity in the medium). On the other hand, the time when an ultrasonic wave reflected by a reflector which is at a distance of 2 y from the transducer array is received will also be 4 y/c, which is the same instant of time as when the multiple reflection wave is received.

In the case of a conventional ultrasonic diagnostic apparatus, since the direction of transmission of an ultrasonic pulse and the direction of reception of reflected waves are coincident with each other, it is impossible to separate two reflected waves that are received at the same instant of time. Thus, the multiple reflection wave which has undergone two reflections at the layered structure as shown in FIG. 1 will produce an image artifact which is displayed superimposed upon an ultrasonic image indicating the reflector.

As described above, with the conventional ultrasonic diagnostic apparatus, multiple reflections between tissues forming a layered structure near the body surface and the ultrasonic probe or between internal tissues produce image artifacts in an ultrasonic image, which often makes a serious obstacle to diagnosis.

SUMMARY OF THE INVENTION

It is an object of the present invention to provide an ultrasonic diagnostic apparatus which permits good ultrasonic images to be obtained which have few image artifacts resulting from multiple reflections of ultrasonic waves between an ultrasonic probe and a tissue of a subject under examination or between internal tissues of the subject.

The present invention is arranged to make the direction of a transmitting beam and the direction of a receiving beam differ from each other, receive reflected waves from a region where the transmitting and receiving beams cross each other as the receiving beam, and obtain an ultrasonic tomography image from signals based on the reflected waves.

An ultrasonic diagnostic apparatus according to the present invention is characterized by comprising an ultrasonic probe comprising an array of a plurality of transducer elements for transmitting and receiving ultrasonic waves; driving means for producing driving signals to excite the transducer elements so that a transmitting beam is transmitted from the ultrasonic probe in a predetermined direction; receiving means for receiving ultrasonic reflected waves from within a subject under examination which form receiving waves from a predetermined direction of reception by a predetermined number of elements of the plurality of transducer elements and outputting a received signal; ultrasonic beam direction control means for controlling the driving signals and the receive signal so that the transmitting beam and the receiving waves cross each other within a predetermined region within the subject and the region where the transmitting beam and the receiving waves cross each other is shifted with time; and display means for displaying the ultrasonic reflected waves received by the receiving means as an image. Ultrasonic beam direction control means is characterized by shifting the region where the transmitting and receiving waves cross each other in the direction normal to the array of transducer elements. More specifically, it is characterized in that the array of transducer elements comprises at least a first transducer group for transmitting the transmitting beam and a second transducer group for receiving the receiving waves, and the ultrasonic beam direction control means includes means for forming the region where the transmitting and receiving waves cross each other by setting the midpoints of the first and second transducer group apart from each other.

According to an aspect of the present invention, to acquire reflected wave signals from various depths in a subject under examination, receiving means is characterized by receiving the ultrasonic reflected waves while shifting the focusing point of the receiving waves substantially along the central axis of the transmitting beam.

More specifically, the receiving means is characterized by receiving the ultrasonic reflected waves while changing the number of transducer elements used to receive the ultrasonic reflected waves according to distances between the region where the transmitting and receiving waves cross each other and the transducer array and shifting the receiving waves focusing point substantially along the central axis of the transmitting beam, receiving the receiving waves without changing the midpoint of transducer elements used to the ultrasonic reflected waves, or receiving the ultrasonic reflected waves while shifting the midpoint of transducer elements used to receive the ultrasonic reflected waves according to distances between the region where the transmitting and receiving waves cross each other and the transducer array and shifting the receiving waves focusing point substantially along the central axis of the transmitting beam.

It is characterized in that the transducer array includes a plurality of ultrasonic reflected wave receiving transducer groups and wherein further includes means for detecting respective ultrasonic reflected waves received by the plurality of receiving transducer groups and adding them.

In the present invention, as described above, the direction of a transmitting beam and the direction of a receiving beam are made different from each other and reflected waves are received as a receiving beam from a region where the transmitting and receiving beams cross each other for ultrasonic tomography imaging. Consequently, even if multiple reflection waves are received at the same instants of time as when wanted reflected waves are received, the receiving sensitivity for the multiple reflection waves will be lowered because regions where multiple reflections occur are out of the region where the transmitting and receiving beams cross each other.

The simultaneous reception of multiple reflection waves and wanted reflected waves means that the multiple reflection waves are produced by a layered structure located at a smaller depth than the transmitting and receiving beam crossing region. Thus, the multiple reflection waves will scarcely be detected in the receiving beam for receiving reflected waves from a reflector exiting within the crossing region, which reduces image artifacts due to multiple reflections significantly.

According to the present invention, as described above, by making the direction of a transmitting beam and the direction of a receiving beam differ from each other and receiving reflected waves from the beam crossing region as a receiving beam, image artifacts due to multiple reflections within a subject under examination can be reduced considerably. This permits, for instance, more exact qualitative diagnosis of cystic polyp which has been considered so far to be difficult.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 illustrates the principle of the present invention;

FIG. 3 is a block diagram of a linear electronic scanning ultrasonic diagnostic apparatus according to a first embodiment of the present invention;

FIG. 4 illustrates an example of a scanning method according to the present invention;

FIG. 5 illustrates a method of shifting a transmit beam and a receive beam;

FIG. 6 illustrates another example of the scanning method of the present invention;

FIG. 7 illustrates still another example of the scanning method of the present invention;

FIG. 8 illustrates a further example of the scanning method of the present invention.

DETAILED DESCRIPTION OF THE PREFERRED EMBODIMENTS

First, reference will be made to FIGS. 1 and 2 to describe the principle of the present invention.

Figure 1:
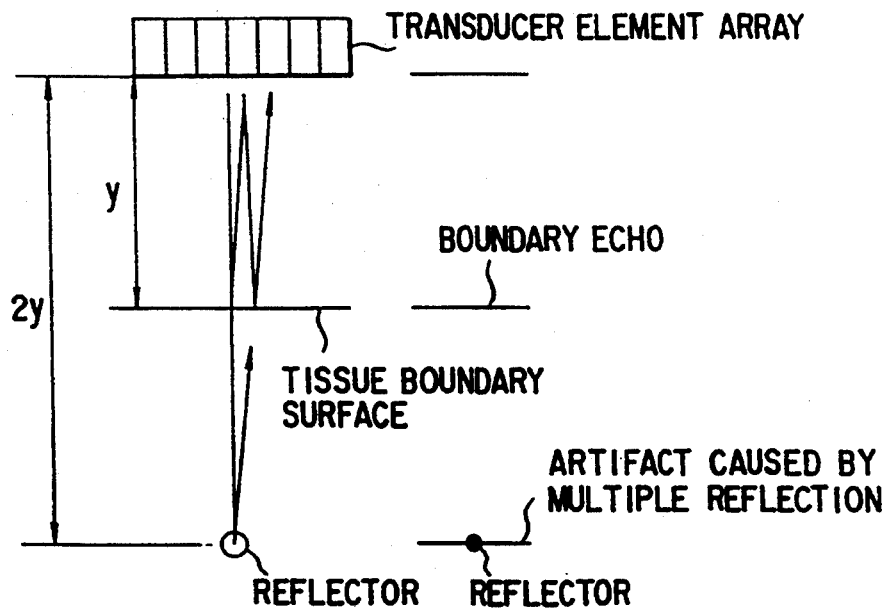
FIG. 1 illustrates a conventional technique.

It is assumed that, as shown in FIGS. 1 and 2, a transducer array is placed at a distance of y from a layered structure substantially parallel to the transducer array, i.e., the boundary surface of internal tissues of the body of a subject under examination. The time when a reflected wave which has undergone two reflections at the layered structure is received by the transducer array is 4 y/c, which is the same instant of time as when a reflected wave from a reflector at a distance of 2 y from the transducer array is received.

In the ultrasonic diagnostic apparatus as shown in FIG. 1, the direction of transmission of a pulse of ultrasound and the direction of reception of a reflected wave are coincident with each other. That is, in the conventional apparatus, the transmitting transducer aperture for forming an ultrasonic beam (a transmitting beam) at the time of transmission and the receiving transducer aperture for forming an ultrasonic beam (a receiving beam) at the time of reception are coincident with each other. As described previously, therefore, a wanted reflected wave which has undergone a single reflection at a reflector within the body and a multiple reflection wave will be received at the same position in the transducer array. If these two reflected waves are received at the same instant of time, then they cannot be separated. Consequently, the multiple reflection wave will appear as an image artifact on a wanted tomography image for the reflector.

In the present invention, as shown in FIG. 2, each of the transmitting transducer aperture and the receiving transducer aperture is set by a separate group of transducer elements. That is, the center of a group of transmitting transducer elements forming the transmitting transducer aperture is set at x1, while the center of a group of receiving transducer elements forming the receiving transducer aperture is set at x2, both the centers being spaced Δx apart.

A pulse of ultrasound is transmitted from the transmitting transducer element group in the direction of the depth of the living body (in the Y direction), and a reflected wave from an internal tissue is received by the receiving transducer element group. When a reflected wave from a reflector at a depth of 2 y is received, the directivity of reception is set to the direction of 0-degree with respect to the Y direction. That is, the receiving beam is received from an angle of $\theta$ relative to the normal to the transducer array (hereinafter referred to as the receiving beam deflecting angle). In this case, the distance from the probe to the focal point of the receiving beam (hereinafter referred to as the receiving beam focal distance) F is set to 2 y. The receiving beam deflecting angle $\theta$, the receiving beam focal distance F, and the spacing Δx between the centers of the transmitting and receiving transducer element groups are related by $$tan\theta = \Delta x/F$$

Since, in this case, reflected waves from a transmitting- and receiving-beam intersecting region are mainly received, a wanted reflected wave (a reflected wave from the reflector at the depth 2 y) can be received. However, multiple reflection waves which are produced by a layered structure at the depth of y will scarcely be received. The reason is that the region where the multiple reflection waves are produced does not exist within the transmitting- and receiving-beam intersecting region. Thus, it becomes possible to obtain good ultrasonic tomography images free of artifacts due to multiple reflections.

It is desirable that the spacing between the center of the transmitting transducer aperture and the center of the receiving transducer aperture be set suitably by an operator (observer). The reason is that, when the spacing is too small, the multiple reflection reducing effect is lessened, and when it is too large, the receiving sensitivity is lowered.

Next, an application of the present invention to a linear electronic scanning ultrasonic diagnostic apparatus will be described. FIG. 3 is a block diagram of an ultrasonic diagnostic apparatus according to an embodiment of the present invention.

In FIG. 3, an ultrasonic probe 5 consists of a one-dimensional array of M transducer elements 5-1 to 5-M. At the time of transmission, rate pulses for determining the cycle period of pulses of ultrasonic waves are first output from a pulse generator 1. The rate pulses are sent to N-channel transmitting delay circuits 2-1 to 2-N where delay times are set to determine the transmitting beam focal distance. The rate pulses are then applied to N-channel driving circuits 3-1 to 3-N, which generate driving pulses for driving N transducer elements in 5-1 to 5-M. The timing of the driving pulses is determined by the outputs of the transmitting delay circuits 2-1 to 2-N.

The driving pulses from the driving circuits 3-1 to 3-N are selectively applied via an electronic switch circuit 4 to N transmitting transducer elements, of M transducer elements 5-1 to 5-M of the ultrasonic probe 5, which are basically adjacent to one another. The N transducer elements are thus excited, so that pulses of ultrasound having directivity are directed to a living body not shown.

Ultrasonic pulses directed into the body by the ultrasonic probe are reflected within the body and the reflected waves are received by the ultrasonic probe 5. At the time of receiving the reflected waves, transducer elements to be used for reception are selected by the electronic switch circuit 4 so that the center of the transducer element group used for reception and the center of the transducer element group which was used for transmission may be apart from each other. Only the reflected waves that are received by the transducer element group selected by the electronic switch circuit 4 are taken out from the electronic switch circuit 4 as reflected wave signals. In many cases, the number N' of transducer elements used for reception is generally made different from the number N of transducer elements used for transmission. In this way, the selection of transducer elements as shown in FIG. 2 is made by the electronic switch circuit 4.

At the time of reception, those reflected wave signals from the N' transducer elements which are taken out through the electronic switch circuit 4 are applied to N'-channel receiving delay circuits 6-1 to 6-N', respectively, and delay times for determining the receiving beam focal distance (F') and delay times for providing the receiving beam deflection angle $\theta$ are provided simultaneously to the receiving signals from transducer elements selected by the electronic switch circuit 4. In this case, in order to receive reflected waves from reflectors at various depths within the body, the receiving delay circuits 6-1 to 6-N' control the receiving beam deflection angle $\theta$ so that it varies momently with receiving time.

Output signals of the receiving delay circuits 6-1 to 6-N' are sent to an adder 7 where they are added together. An output signal of the adder 7 is applied to a logarithmic amplifier 8 where it is subjected to logarithmic compression. The signal is further applied to an envelope detecting circuit 9 and an analog-to-digital (A/D) converter 10. A digital output signal of the A/D converter 10 is temporarily stored in an image memory 11. An image stored in the image memory 11 is output in the television format and then displayed as a ultrasonic image, i.e., a B-mode tomography image on a television monitor 12.

The output signal of the adder 7 is also fed into a Doppler signal detecting unit for blood flow imaging. At the initial stage of the Doppler signal detecting unit there are provided two orthogonal phase detecting circuits each composed of a mixer 15-1 (15-2) and a low-pass filter 16-1 (16-2). The output signal of the adder 7 is applied to each of the mixers 15-1 and 15-2 at its one input. To the other input of the mixer 15-1 is directly applied a continuous-wave signal of a given frequency (fo) from a reference signal generator 13. To the other input of the mixer 15-2 is applied the output signal of the reference signal generator 13 via a 90-degree phase shifter 14. Each of the mixers 15-1 and 15-2 mixes its two inputs and provides an output containing frequency components equal to their difference and sum. Each of the low-pass filters 16-1 and 16-2 removes the sum frequency component from the output of the corresponding mixer; only the difference frequency component is extracted. Thus, the orthogonal phase detection is carried out.

Signals subjected to orthogonal phase detection are converted by analog-to-digital (A/D) converters 17-1 and 17-2 to digital signals, which, in turn, are stored temporarily in memories 18-1 and 18-2. In order to calculate Doppler signals, it is necessary to scan the same region within the body successively and use a plurality of signals obtained at each scan. Accordingly, these pluralities of signals are temporarily stored in the memories 18-1 and 18-2 and then frequency analysis of Doppler signals is made by means of a spectrum analyzer 19 when a predetermined number of pieces of data are obtained. As physical quantities to be displayed in the ultrasonic blood flow imaging, the spectrum analyzer 19 calculates the spectrum center value (that is, the mean value of blood flow velocity) and the spectrum variance (that is, the disturbance of flow velocity). The values calculated by the spectrum analyzer 19 are stored temporarily in the image memory 11 and then displayed in color superimposed upon the ultrasonic tomography image on the television monitor 12.

In linear electronic scanning ultrasonic diagnostic apparatus and convex scanning ultrasonic diagnostic apparatus, the transducer elements are selected in sequence, one at a time, synchronously with the timing of the rate pulses output from the pulse generator 1 with the above-described directional relationship between the transmitting and receiving beams maintained.

The linear scanning method used in the present embodiment will be described in detail with reference to FIGS. 4 and 5. In the transducer array comprised of M transducer elements 5-1 to 5-M used as the ultrasonic probe 5, for example, the n-th to (n+k)th transducer elements are used as the transmitting transducer group T, while the n'-th to (n'+k')th transducer elements are used as the receiving transducer group R. The central axis of a transmitting beam formed by the transmitting transducer group T is axially subdivided at intervals of a distance equal to the image pixel size $\Delta Y$ by way of example. Here, pixel $\Delta y1$ to pixel $\Delta y4$ will be described for the sake of convenience.

To receive a reflected wave signal from the pixel $\Delta y1$ at the time of reception, the receiving beam is steered or deflected electronically to an angle $\theta 1$ from that central axis and focused on the pixel $\Delta y1$ by the receiving transducer group R. It is generally well known that the electronic steering and focusing of receiving beams can be realized by controlling the receiving delay circuits 6-1 to 6-N' of FIG. 3 so as to provide a predetermined delay amount to each of signals received by the transducers. Thus, a detailed description thereof is omitted here.

The delay times are controlled successively so as to shift the receiving beam focusing point to the pixel $\Delta y2$, pixel $\Delta y3$, and pixel $\Delta y4$ in sequence.

In the above manner a single scan operation is completed by the use of the transmitting transducer group T and the receiving transducer group R.

As shown in FIG. 5, another scan is made in the same manner as described above by the use of the transmitting transducer group T' composed of the (n+l)th to (n+k+l)th transducer elements and the receiving transducer group R' composed of the (n'+l)th to (n'+k'+l)th transducer elements. This scan is shifted one transducer element. Likewise, subsequent scans are made while the transmitting and receiving transducer groups used are each shifted one transducer element.

In FIG. 4, the transmitting transducer group T (for example, the n-th to (n+k)th transducer elements) and the receiving transducer group R (for example, the n'-th to (n'+k)th transducer elements) are separated from each other. However, this is not always needed. Part of transducer elements may be used for transmission and reception; transmitting and receiving transducer groups may overlap each other.

With an electronic sector scanning ultrasonic diagnostic apparatus there is no need of shifting transmitting and receiving transducer groups at each rate pulse. However, the sector scanning apparatus is the same as the linear scanning apparatus in that the center of the transmitting transducer group is apart from the center of the receiving transducer group and reflected wave signals from a region where transmitting and receiving beams cross each other are received for ultrasonic imaging. In general, a sector scanning ultrasonic probe has not so many transducer elements. For some resolution (here azimuth resolution) it is not preferable to decrease the number of transducer elements used for transmission and reception. With the electronic sector scanning ultrasonic diagnostic apparatus, therefore, it is desirable that transmitting and receiving transducer groups overlap each other as described above.

That is, in the present invention it is required that the centers of the transmitting and receiving transducer groups be apart from each other, but it does not matter whether the transmitting and receiving transducer groups overlap each other or not.

Other scanning methods of the present invention will be described with reference to FIGS. 6 to 9.

In the scanning method illustrated in FIG. 4, when receiving a reflected wave from a region at a small depth such as the pixel $\Delta y1$, the deflection angle $\theta 1$ of the receiving beam is great, and thus the receiving beam is liable to be accompanied with side lobes, which incurs the possibility that artifacts due to the side lobes may occur. FIGS. 6 and 7 illustrate scanning methods to resolve that problem.

FIG. 6 shows an application of a so-called variable transducer aperture method in which the receiving transducer aperture (i.e., the number of receiving transducer elements) is made variable to the present invention.

In the variable transducer aperture method, as the receiving beam focusing point is shifted deeper from the pixel $\Delta y1$ to the pixels $\Delta y2, \Delta y3, \ldots$, with receiving time, the receiving beam deflection angle is made small gradually (i.e., $\theta 1, \theta 2, \ldots$) and, at the same time, the number of receiving transducer elements R1, R2, ..., is increased with time to thereby increase the receiving transducer aperture. Such control of the receiving beam focusing point and the receiving transducer aperture is performed by the electronic switch circuit 4 and the N'-channel receiving delay circuits 6-1 to 6-N' shown in FIG. 3.

By using the variable transducer aperture method and increasing the receiving transducer aperture with decreasing receiving beam deflection angle, the production of side lobes in the receiving beam is made difficult, which permits the degradation of ultrasonic image quality due to side lobes to be avoided.

According to the scanning method shown in FIG. 7, the receiving beam deflection angle ($\theta$) is held substantially constant with the receiving transducer aperture unchanged by setting the midpoints of receiving transducer groups R1, R2, ..., away from the transmitting transducer group T with their distances to the group T increasing in the order of R1, R2, .., as the receiving beam focusing point is shifted deeper from the pixel $\Delta y1$ to the pixels $\Delta y2, \Delta y3, \ldots$, with receiving time. Such control of the receiving beam focusing point and the midpoints of the receiving transducer groups R1, R2, .

..., is performed by the electronic switch circuit 4 and the N'-channel receiving delay circuits 6-1 to 6-N' shown in FIG. 3.

According to the scanning method shown in FIG. 7, the receiving beam deflection angle can be held substantially constant. Further, by setting the receiving beam deflection angle so that it may not become too large, the production of side lobes in the receiving beam can be suppressed, permitting the degradation of ultrasonic image quality to be avoided.

The scanning methods shown in FIGS. 6 and 7 may be used in combination.

With the scanning methods shown in FIGS. 4 to 7, a set of transducer groups is used to receive a reflected wave from a predetermined location (depth). Alternatively, two or more sets of transducer groups may be used.

In a scanning method shown in FIG. 8, receiving transducer groups Rb and Ra are provided on the right and left sides of the transmitting transducer group T. In the case of this scanning method, reflected waves from a region at given depth are simultaneously received by the receiving transducer groups Ra and Rb. Alternatively, it may be arranged so as to transmit ultrasonic waves twice, receive reflected waves by each of the receiving transducer groups Ra and Rb with a time difference, and sum the reflected wave signals received by the transducer groups Ra and Rb after their detection.

In the former case, two receiving circuits are required to simultaneously receive reflected waves from the receiving transducer groups Ra and Rb, increasing complexity. In the latter case, on the other hand, a storage circuit is required to temporarily store one of detected signals and moreover the time required to obtain a single tomography image is doubled, degrading real-time performance. However, the summation of reflected wave signals obtained from receiving beams from two or more directions provides not only an improvement in the signal-to-noise ratio but also a reduction in the interference pattern (speckle pattern) resulting from interference between ultrasonic waves.

With the scanning methods shown in FIGS. 4 to 8, it is required to obtain reflected waves in sequence along the central axis of a transmitting beam and to change the receiving beam deflection angle finely with receiving time. More specifically, it is required to change the receiving beam deflection angle in units of pixels of an ultrasonic image. In order to realize such fine control of the receiving beam deflection angle, it is preferable to use digital receiving delay circuits.

Figure 9:
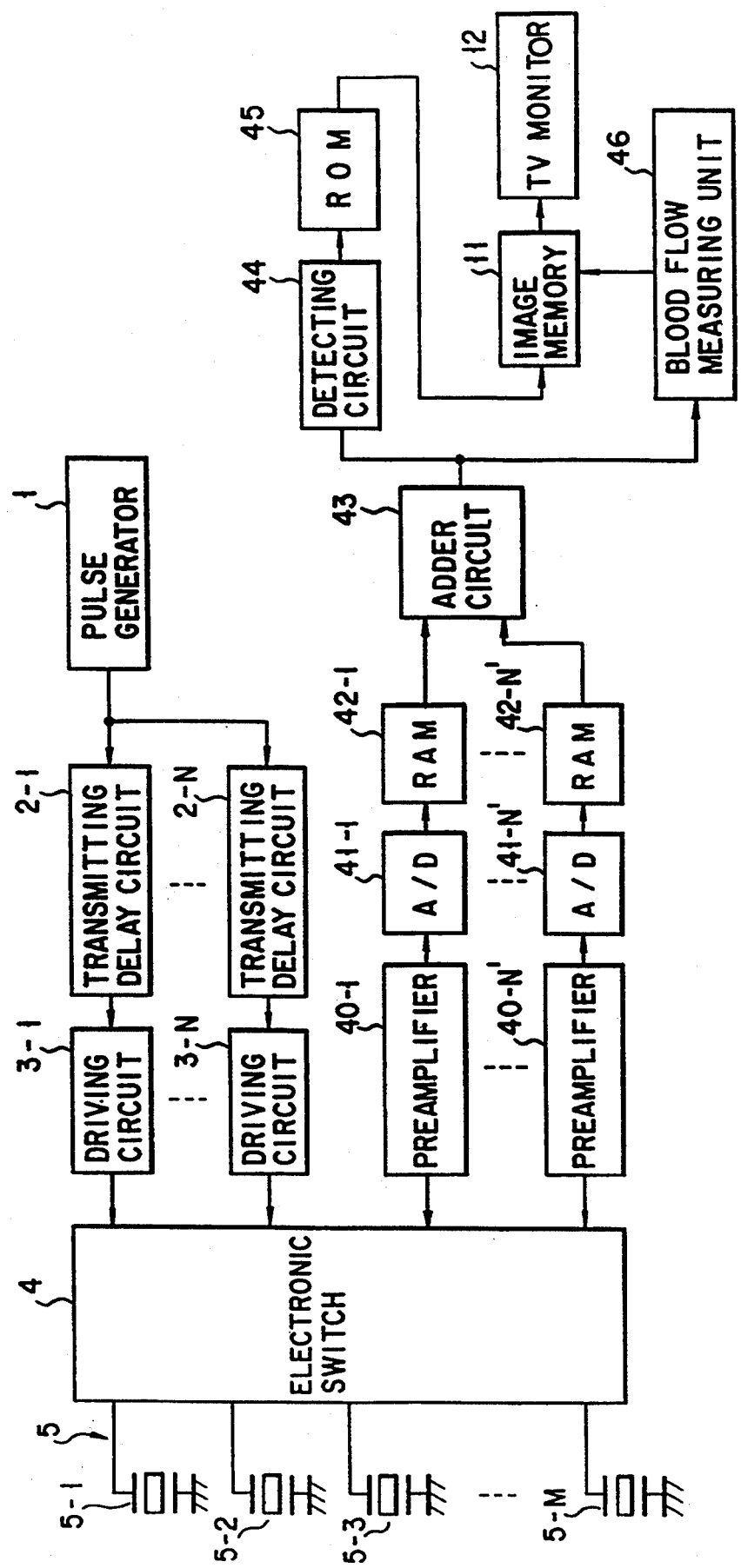
FIG. 9 is a block diagram of a linear electronic scanning ultrasonic diagnostic apparatus according to a second embodiment of the present invention.

FIG. 9 is a block diagram of a linear electronic scanning ultrasonic apparatus according to the other embodiment of the present invention in which a digital-circuit version of the receiving circuit system is attained, including the receiving delay circuits. However, description here is limited to ultrasonic tomography imaging because the arrangement and function for blood flow imaging are substantially the same as conventional.

The apparatus shown in FIG. 9 is basically composed of an array type ultrasonic probe 5, a transmission unit, a digital receiving unit, a B-mode image processing circuit, a blood flow detecting unit 46, and a video unit.

The transmission unit, which is composed of ultrasonic probe 5, pulse generator 1, transmitting delay circuits 2-1 to 2-N, and driver circuits 3-1 to 3-N, is the same as that in the embodiment shown in FIG. 3, and thus its description is omitted.

The digital receiving unit is constructed from preamplifiers 40-1 to 40-N', A/D converters 41-1 to 41-N', RAMs (or shift registers) 42-1 to 42-N' serving as delay circuits, and an adder circuit 43. Each of the preamplifiers 40-1 to 40-N' amplifies a reflected wave signal from a corresponding one of the transducers 5-1 to 5-N' in the ultrasonic probe 5 to an appropriate level, and each of the A/D converters 41-1 to 41-N' converts an output of a corresponding one of the preamplifiers 40-1 to 40-N' into a digital form.

Each of the RAMs (Random Access Memories) 42-1 to 42-N', serving as receiving delay circuits, stores temporarily a digital output signal of a corresponding one of the A/D converters 41-1 to 41-N' and outputs it after a delay of a predetermined period of time. The adder circuit 43 adds delayed outputs of the RAMs in digital manner and sends their sum to the B-mode image processing circuit.

The B-mode image processing circuit comprises an envelope detecting circuit 44 consisting of an absolute value circuit and a low pass filter (not shown) and a logarithmic conversion table 45 consisting of a ROM (Read Only Memory). The envelope detecting circuit 44 detects the envelope of an output signal of the adder circuit 43, and the logarithmic conversion table (ROM) 45 subjects the amplitude of an output of the detecting circuit 44 to logarithmic conversion. An image signal obtained from the B-mode image processing circuit is stored in image memory 11 of the video unit and then displayed on TV monitor 12. The blood flow detecting unit 46 is the same as conventional and thus its description is omitted.

Although the above embodiments were described taking, as an example, linear electronic scanning ultrasonic diagnostic apparatus, use may also be made of exactly the same arrangement as in the above embodiments in convex scanning ultrasonic diagnostic apparatus, which has been widely used for abdominal diagnosis in recent years, in order to reduce multiple reflections. In sector scanning ultrasonic diagnostic apparatus, the deflection of a transmitting beam is performed instead of switching the transducer elements. In this case as well, the present invention is adaptable by making the central positions of transmitting and receiving beams differ from each other.

Although, in the above embodiments, the direction of a transmitting beam in the linear scanning and convex scanning systems is made normal to the plane of transducer elements, this is not restrictive. For example, as in the sector scan system, a transmitting beam may be generated at a predetermined angle relative to the normal to the transducer array.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An ultrasonic diagnostic apparatus which scans an object to obtain a tomographic image thereof comprising:

an ultrasonic probe comprising an array of a plurality of transducer elements for transmitting and receiving ultrasonic waves;

driving means for producing driving signals to excite a first group of said plurality of transducer elements so that a transmitting beam is transmitted from said ultrasonic probe in a predetermined direction;

receiving means for receiving reflected ultrasonic waves from within a subject under examination which form receiving waves in a predetermined direction of reception by a second group of said plurality of transducer elements and outputting a received signal;

ultrasonic beam direction control means for controlling said driving signals and said received signal so that said transmitting beam and said receiving waves cross each other within a predetermined region within said subject and said region where said transmitting beam and said receiving waves cross each other is shifted in a direction away from said transducer elements with time; and display means for displaying said ultrasonic reflected waves received by said receiving means as an image.

2. An apparatus according to claim 1, wherein said ultrasonic beam direction control means includes means for shifting said region where said transmitting and receiving waves cross each other in the direction normal to said array of transducer elements.

3. An apparatus according to claim 2, wherein said ultrasonic beam direction control means includes means for forming said region where said transmitting and receiving waves cross each other by setting the midpoints of said first and second transducer group apart from each other.

4. An apparatus according to any one of claims 1 to 3, wherein said transducer array includes a plurality of reflected ultrasonic wave receiving transducer groups and wherein further includes means for detecting respective reflected ultrasonic waves received by said plurality of receiving transducer groups and adding them.

5. An apparatus according to claim 1, wherein said ultrasonic beam direction control means includes means for forming said region where said transmitting and receiving waves cross each other by setting the midpoints of said first and second transducer group apart from each other.

6. An apparatus according to any one of claims 1 to 3, wherein said receiving means includes means for receiving said reflected ultrasonic waves while shifting the focusing point of said receiving waves substantially along the central axis of said transmitting beam.

7. An apparatus according to any one of claims 1 to 3, wherein said receiving means includes means for receiving said reflected ultrasonic waves while shifting the midpoint of transducer elements used to receive said reflected ultrasonic waves according to distances between said region where said transmitting and receiving waves cross each other and said transducer array and shifting said receiving waves focusing point substantially along the central axis of said transmitting beam.

8. An apparatus according to any one of claims 1 to 3, wherein said receiving means includes means for receiving said reflected ultrasonic waves while changing the number of transducer elements used to receive said reflected ultrasonic waves according to distances between said region where said transmitting and receiving waves cross each other and said transducer array and shifting said receiving waves focusing point substantially along the central axis of said transmitting beam.

9. An apparatus according to claim 8, wherein said receiving means includes means for receiving said receiving waves without changing the midpoint of transducer elements used to said ultrasonic reflected waves.

10. An apparatus according to claim 8, wherein said receiving means includes means for receiving said reflected ultrasonic waves while shifting the midpoint of transducer elements used to receive said reflected ultrasonic waves according to distances between said region where said transmitting and receiving waves cross each other and said transducer array and shifting said receiving waves focusing point substantially along the central axis of said transmitting beam.

* * * * *

UNITED STATES PATENT AND TRADEMARK OFFICE
CERTIFICATE OF CORRECTION

PATENT NO. : 5,421,333
DATED : June 06, 1995
INVENTOR(S) : Kinya TAKAMIZAWA et al.

It is certified that error appears in the above-indentified patent and that said Letters Patent is hereby corrected as shown below:

CLAIM 9, COLUMN 12, LINE 32, AFTER "used to" INSERT --receive-- AND "ultrasonic reflected" SHOULD READ --reflected ultrasonic--.

CLAIM 4, COLUMN 11, LINE 34; CLAIM 6, COLUMN 12, LINE 5; CLAIM 7, COLUMN 12, LINE 10; CLAIM 8, COLUMN 12, LINE 20, "claims 1 to 3" SHOULD READ --claims 1 to 3 and 5--.

Signed and Sealed this

Eleventh Day of March, 1997

Attest:

BRUCE LEHMAN

Attesting Officer

*Commissioner of Patents and Trademarks*